United States Patent [19]

Kerkow

[11] 4,383,629
[45] May 17, 1983

[54] REAR BAGGAGE CARRIER OR RACK

[76] Inventor: Volkmar Kerkow, Kalenbarg 12, 2000 Hamburg 53, Fed. Rep. of Germany

[21] Appl. No.: 254,082

[22] Filed: Apr. 14, 1981

[30] Foreign Application Priority Data

Jul. 5, 1980 [DE] Fed. Rep. of Germany ....... 8018067

[51] Int. Cl.³ .............................................. B60R 9/00
[52] U.S. Cl. ................................. 224/329; 224/42.07; 224/42.44
[58] Field of Search ..................... 224/42.08, 309, 314, 224/329, 42.44, 42.45 R, 42.46 R, 42.21, 330, 331, 42.07, 42.03 R, 42.03 A; 248/339, 340

[56] References Cited

U.S. PATENT DOCUMENTS

| 1,808,042 | 6/1931 | Kennedy | 224/42.44 |
| 3,927,810 | 12/1975 | Danon | 224/314 |
| 4,241,858 | 12/1980 | Lawroski | 224/42.03 R X |
| 4,249,683 | 2/1981 | Park | 224/42.21 X |

FOREIGN PATENT DOCUMENTS

| 395764 | 12/1965 | Switzerland | 224/337 |
| 633774 | 12/1949 | United Kingdom | 224/42.03 R |

*Primary Examiner*—Allan N. Shoap
*Attorney, Agent, or Firm*—Cushman, Darby & Cushman

[57] ABSTRACT

A rear baggage carrier or rack for minibuses, motorhomes, etc., with a base frame and a support frame for baggage. At the upper end, the base frame has bent supporting arms with transverse spars, which can be engaged with the vehicle water run-off rim. The lower end of the base frame is connected to brackets, fixed to the bodywork in the vicinity of the license plate, in such a way that a downwardly directed tensile stress is exerted on the base frame.

5 Claims, 3 Drawing Figures

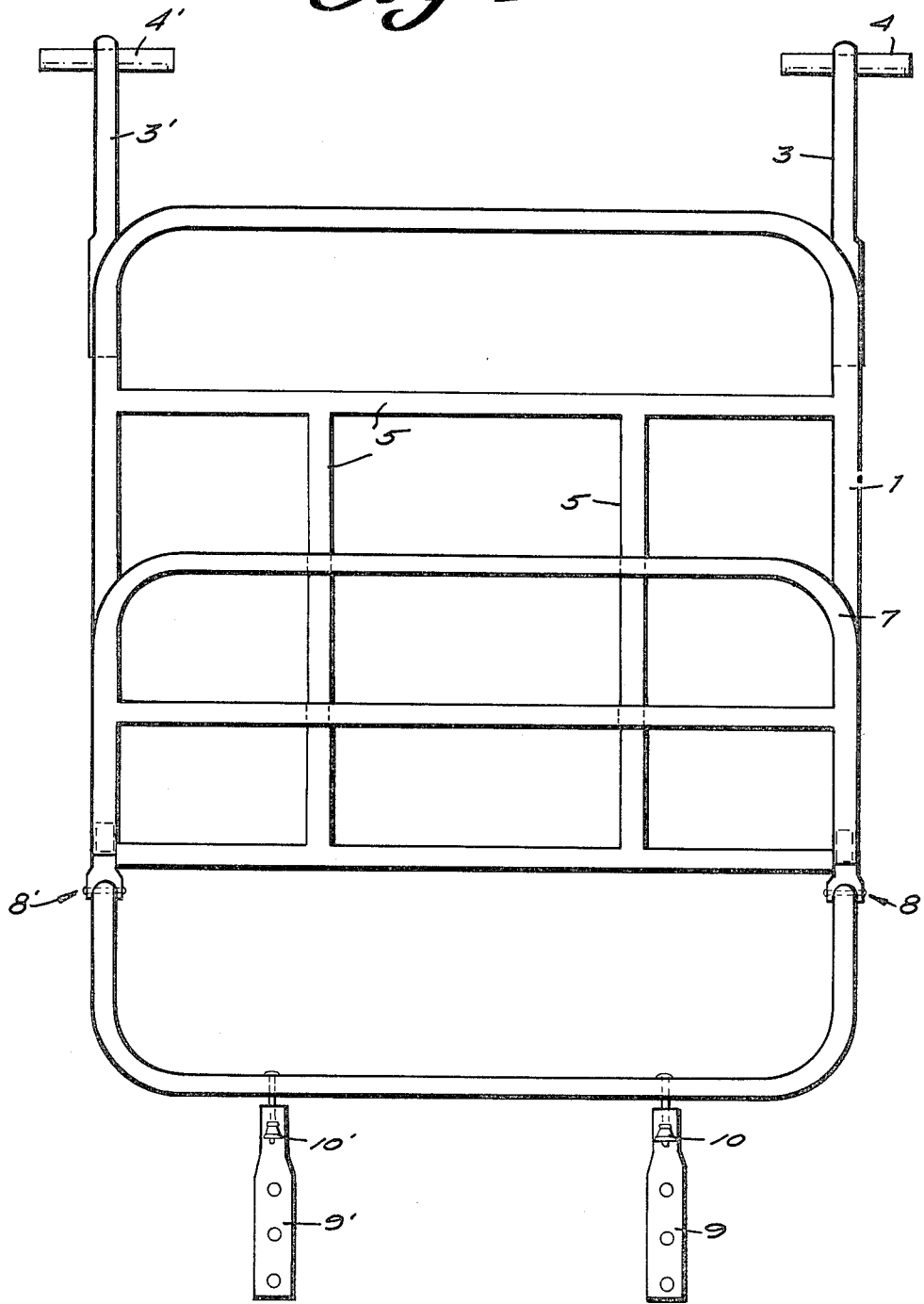

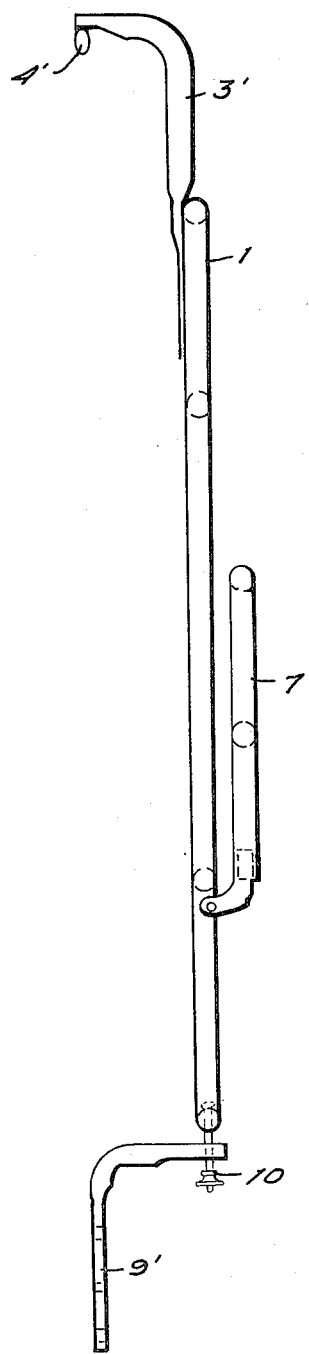
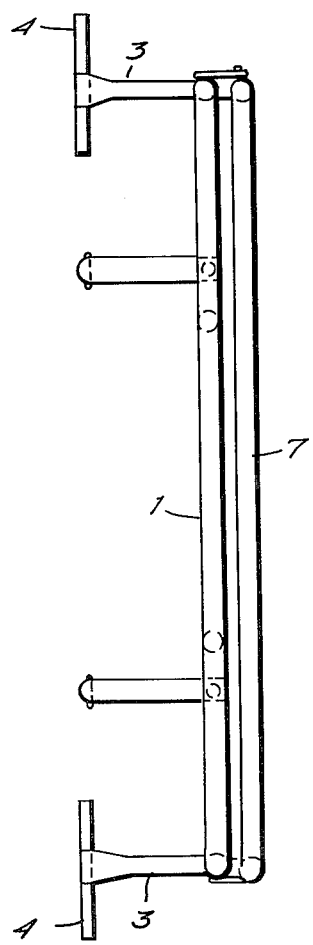

REAR BAGGAGE CARRIER OR RACK

The invention relates to a rear baggage carrier or rack for minibuses, motorhomes, etc., comprising a base frame and a support frame for baggage.

BACKGROUND OF THE INVENTION

Such rear baggage carriers have already been used on the VW Beetle, where the upper end of the base frame was held by clamps passing through vent slots below the rear window which clamps were fixed to the ribs formed between such vent slots, whilst the lower end of the base frame was fitted to the bumper mountings.

This solution has the disadvantage that relatively powerful vibrations were transmitted from the fender mountings to the base frame and then onto the ribs between the vent slots. As a result, the ribs between the vent slots became bent. However, even if no such vibrations occurred the ribs between the vent slots could be damaged due to the considerable weight of the loaded baggage carrier. In addition, it was very difficult to remove such prior rear baggage carriers from the vehicle, so that only complicated and time-consuming disassembling enabled the hood of the rear-engined VW Beetle to be opened. Finally, fixture to minibuses, motorhomes, etc., was not possible because they have no vent slots in their rear wall.

It is also already known to fix roof baggage carriers or racks to the roof of minibuses, mobile homes, etc. in order to be able to carry additional baggage thereon. However, such roof racks are not only difficult to reach and therefore to load, but also they lead to a higher vehicle center of gravity position, as well as a modified flow profile, so that the traveling behaviour of the vehicle is impaired.

OBJECT OF THE INVENTION

The object of the invention is to provide a rear baggage carrier for minibuses, motorhomes, etc., which can be easily fitted and removed and which do not significantly impair the flow profile and travelling behaviour of the vehicle.

BRIEF DESCRIPTION OF THE INVENTION

According to the invention, this object is solved by a rear baggage carrier comprising a base frame and a support frame for baggage, characterized in that at the upper end of the base frame are provided supporting arms bent towards the side remote from the support frame and whose free ends are bent downwards and carry transverse spars which can be engaged with the water run-off rim of the minibus, motorhome, etc. or engaged with profile members fixed in or in the vicinity of the transition area to the roof and that the lower end of the base frame is connectable to brackets secured to the bodywork in the vicinity of the license plate in such a way that the base frame is under a downwardly directed tensile stress. Preferably, the base frame and/or support frame are made from steel tubing.

For fitting the rear baggage carrier, the transverse spars provided on the supporting arms are merely inserted in the water run-off rim or the profile members fixed for this purpose in the transition area of the roof, so that the complete base frame is held in suspended manner with the support frame. This is followed by the connection to the brackets previously fixed to the bodywork, the base frame being drawn downwards in such a way that the transverse spars are secured in the water run-off rim or in the profile members and the baggage carrier cannot become detached during the journey, no matter whether it is loaded or not.

The support frame is preferably pivotably fixed to the base frame. It is pivotable between a first position in which it substantially engages on the base frame and a second position in which it extends substantially at a right angle to the base frame, i.e. is able to receive items of baggage. As a result, when the baggage carrier is not in use, i.e. with the support frame in the first position, the vehicle length is not increased and this only occurs when the support frame is actually required.

The lower end of the base frame can be connected to the brackets by means of screws and nuts, so that corresponding tightening of the nuts leads to the requisite tensile stress being exerted on the base frame by the screws.

BRIEF DESCRIPTION OF THE DRAWINGS

FIG. 1 is a plan view of a rear baggage carrier according to the invention with the support frame in the first position.

FIG. 2 is a side view of the baggage carrier of FIG. 1.

FIG. 3 is a top view of the baggage carrier of FIGS. 1 and 2.

DETAILED DESCRIPTION OF THE INVENTION

The rear baggage carrier has a base frame 1 made from steel tubing and which is reinforced with welded-in struts 5, which also comprise steel tubing. A support frame 7, made from steel tubing is pivotably fixed to the frame 1 below the lower, transversely extending strut 5. For this purpose, support frame 7 has forked ends fixed to the base frame at 8 by means of screws extending through the tubing of base frame 1. Between the forked ends and the tubing of base frame 1, not shown elastic plastic washers can be placed on the screws which, on tightening the nuts placed on the screws and during the resulting compression of the forked ends, are also compressed, thereby producing an adequate friction in order to keep support frame 7 in the represented first position without additional mounting means. If the support frame 7 is pivoted about the hinge joints 8 downwards into the second, not shown position, then in FIG. 2 it extends to the right and perpendicular to the plane of base frame 1. It is held in this position by the engagement of the inner areas of its forked ends on the adjacent tubing of base frame 1, so that it can take baggage of all types, e.g. also bicycles, outboard motors and other bulky items.

As an extension to the outer tubing of the support frame 7, supporting arms 3,3' are welded to the upper end of base frame 1 which, as shown in FIGS. 2 and 3, are bent towards the side remote from support frame 7, i.e. to the left in FIGS. 2 and 3. Transverse spars 4,4' are welded to the free ends of supporting frames 3,3' and their cross-section is chosen in such a way that they fit into the water run-off rim of a minibus, motorhome, etc. As shown by dotted lines in FIG. 1, it is possible to provide, preferably by adhesion, plastic or rubber pieces on the undersides of transverse spars 4,4', so as to prevent metal - metal contact between the vehicle water run-off rim and the transverse spar.

Two L-shaped brackets 9,9' are also used for fixing the rear baggage carrier to the vehicle, whereby three bores are provided in the lower leg thereof extending substantially parallel to the plane of base frame 1 and by means of which they can be fixed to the vehicle bodywork by using screws. This attachment takes place in the vicinity of the license plate, where vehicles normally have a flat surface. It is optionally possible to pass each of the screws for fixing the license plate through a bore in brackets 9, 9', so that after fitting brackets 9,9' the license plate can be fixed to the downwardly extending legs thereof.

A bore is provided in the leg of bracket 9,9' extending substantially perpendicular to the plane of base frame 1 and in the case of correct fitting of the brackets to the vehicle, it is aligned with corresponding bores in the lower, transversely directed tubing of base frame 1. Screw bolts are inserted through the bores in base frame 1 and brackets 9,9', so that in the shown manner knurled nuts 10,10' can be screwed onto their free ends. When screwing on the knurled nuts, the latter rest against the lower face of the corresponding leg of brackets 9,9' and on further screwing on draw the base frame 1 downwards against brackets 9,9', so that the transverse spars 4,4' are firmly held in the water run-off rim. This ensures a simple fixing of the baggage carrier to the vehicle.

Generally, minibuses, motorhomes, etc., have doors or flaps in the rear wall, which must occasionally be opened. If this is necessary, for removing the baggage carrier, the knurled nuts 10,10' are screwed off and the bolts are pulled out. It is then possible to remove without difficulty the base frame 1, even with the baggage located on support frame 7. For temporary storage, it is merely necessary to hang base frame 1 with transverse spars 4,4' in the water run-off rim on the side of the vehicle until the base frame can be installed again.

Minibuses, motorhomes, etc., exist which have no water run-off rim for receiving the transverse spars 4,4'. In order to be able to fit the rear baggage carrier on such vehicles, substantially U-shaped members are screwed in the transition area to the roof or the vicinity thereof and then the transverse spars 4,4' can be placed in them.

As the distance between the water run-off rim and the fixing area of the license plate varies between the individual types of vehicles, adaptation to these different distances is obtained by using correspondingly dimensioned brackets 9,9', so that the base frame including the supporting arms can be identically constructed for all vehicle types and it is merely necessary to use different dimensioned brackets adapted to the particular vehicle type.

What is claimed is:

1. A baggage rack assembly for use with vehicles comprising a base frame member formed with both vertical and horizontal members into a one piece structure and having a front and rear surface as well as upper, lower and intermediate portions, upper support means affixed to each side of said base frame member adjacent the upper portion thereof for supporting said rack on the vehicle, the vehicle having gutter-like structure and said upper support means including a pair of members extending away from the rear surface of said base frame member each of which include a transversely extending spar member adapted to fit within the gutter-like structure, support frame means pivotally attached to said base frame member adjacent the intermediate portion thereof for supporting loads and being movable between raised and lowered positions, at least one bracket for being secured to the vehicle a predetermined distance below the gutter-like structure, and at least one securing means for removably securing the bottom portion of said base frame member to said at least one bracket.

2. A baggage rack assembly as in claim 1 wherein said base frame member and said support frame means are formed from metal tubing.

3. A baggage rack assembly as in claim 1 wherein said support frame means is pivotally connected to said base frame member by means defining a hinge joint therebetween, said hinge joint means including a stop portion for engaging said base frame member at a point below the pivot point for said hinge joint means when said support frame means is in its lowered position.

4. A baggage rack assembly as in claim 1 or 3 wherein said upper support means comprises a pair of L-shaped members having one end portion thereof welded to vertical members at each side of said assembly, with a spar welded at the other end portion of each of said L-shaped members.

5. A baggage rack assembly for use with a vehicle comprising a base frame, said base frame being comprised of right and left vertical side members joined to top and bottom horizontal members, said base frame further including a pair of additional horizontal members attached between said right and left vertical side members at an intermediate position between said top and bottom members and a pair of additional vertical members attached to said pair of additional horizontal members at an intermediate position between said right and left vertical side members so that together the vertical and horizontal members form an integral structure, a pair of upper support members joined to said right and left vertical members, respectively, so that each extends above said top horizontal member, each of said pair of upper support members further including an outer end and a transversely extending spar member attached to said outer end, a support frame pivotally secured to each of said right and left vertical side members at an intermediate point between said top and bottom horizontal members, stop means for limiting the pivotal movement of said support frame so that its pivotal movement is terminated when said support frame is substantially perpendicular to the plane defined by said base frame, said assembly further including at least one connection means for removably connecting said bottom horizontal member to the vehicle.

* * * * *